(12) United States Patent
Liu et al.

(10) Patent No.: US 11,380,141 B2
(45) Date of Patent: Jul. 5, 2022

(54) VEHICLE DIAGNOSIS METHOD, USER EQUIPMENT, AND SERVER

(71) Applicant: SHENZHEN LAUNCH SOFTWARE CO., LTD., Guangdong (CN)

(72) Inventors: Jun Liu, Guangdong (CN); Xiaobing Zhao, Guangdong (CN); Wei Yan, Guangdong (CN); Guozhu Liu, Guangdong (CN)

(73) Assignee: SHENZHEN LAUNCH SOFTWARE CO., LTD., Guangdon (CN)

( * ) Notice: Subject to any disclaimer, the term of this patent is extended or adjusted under 35 U.S.C. 154(b) by 729 days.

(21) Appl. No.: 16/323,841

(22) PCT Filed: Mar. 30, 2018

(86) PCT No.: PCT/CN2018/081436
§ 371 (c)(1),
(2) Date: Feb. 7, 2019

(87) PCT Pub. No.: WO2019/183954
PCT Pub. Date: Oct. 3, 2019

(65) Prior Publication Data
US 2021/0383619 A1      Dec. 9, 2021

(51) Int. Cl.
*G07C 5/00* (2006.01)
*G07C 5/08* (2006.01)
*H04L 9/40* (2022.01)

(52) U.S. Cl.
CPC ........... *G07C 5/008* (2013.01); *G07C 5/0808* (2013.01); *G07C 5/0825* (2013.01); *H04L 63/083* (2013.01); *H04L 63/0876* (2013.01)

(58) Field of Classification Search
CPC .... G07C 5/008; G07C 5/0808; G07C 5/0825; H04L 63/083; H04L 63/0876
See application file for complete search history.

(56) References Cited

U.S. PATENT DOCUMENTS

2002/0007237 A1    1/2002 Phung
2004/0167689 A1    8/2004 Bromley
(Continued)

FOREIGN PATENT DOCUMENTS

CN    104038546    9/2014
CN    105209310    12/2015
(Continued)

OTHER PUBLICATIONS

International Search Report filed in PCT/CN2018/081436 dated Jan. 7, 2019.
(Continued)

*Primary Examiner* — Elaine Gort
*Assistant Examiner* — Anthony M Gartrelle
(74) *Attorney, Agent, or Firm* — Rankin, Hill & Clark LLP (57) ABSTRACT

The present disclosure discloses a vehicle diagnosis method including: sending a login request of a user to a server; returning vehicle type selection data after the server has verified an authenticity of the user successfully; displaying a vehicle type selection interface related to the vehicle type selection data and sending a corresponding vehicle type data to the server based on a vehicle type selected by the user on the vehicle type selection interface via the user equipment; sending corresponding vehicle type data to the server; returning a vehicle diagnosis interface related to the vehicle type data by the server; controlling relevant vehicle terminal to perform corresponding vehicle diagnosis operation by the server when the server receives a vehicle diagnosis instruction as input by the user on the vehicle diagnosis interface; afterwards, displaying vehicle diagnosis operation result fed back by the vehicle terminal through the user equipment.

10 Claims, 7 Drawing Sheets

(56) References Cited

U.S. PATENT DOCUMENTS

| | | | |
|---|---|---|---|
| 2005/0154500 A1* | 7/2005 | Sonnenrein | G06F 7/00 |
| | | | 701/1 |
| 2014/0188328 A1* | 7/2014 | Schneider | G07C 5/008 |
| | | | 701/29.6 |
| 2014/0189814 A1* | 7/2014 | Marten | H04W 12/06 |
| | | | 726/4 |
| 2015/0046021 A1* | 2/2015 | Kim | G07C 5/008 |
| | | | 701/31.4 |
| 2015/0379789 A1 | 12/2015 | Hassib et al. | |
| 2016/0075293 A1 | 3/2016 | Chun | |
| 2016/0335816 A1 | 11/2016 | Thoppae | |
| 2017/0154476 A1 | 6/2017 | Chang | |

FOREIGN PATENT DOCUMENTS

| | | |
|---|---|---|
| CN | 106104636 | 11/2016 |
| CN | 106933623 | 7/2017 |

OTHER PUBLICATIONS

Supplemental European Search Report filed in EP18 83 9660 dated Feb. 27, 2020.
Chinese Office Action filed in 201880000244.6 dated Sep. 1, 2020.

\* cited by examiner

VEHICLE DIAGNOSIS METHOD, USER EQUIPMENT, AND SERVER

TECHNICAL FIELD

The present disclosure relates to the technical field of vehicles, and more particularly to a vehicle diagnosis method, a user equipment, a server and a vehicle diagnosis system.

BACKGROUND

OBD (On-board Diagnostic) system is a system capable of monitoring an operating state of an engine and a working state of a tail gas processing system at any time, OBD data includes vehicular diagnostic data which is obtained by monitoring the engine, a catalytic converter, a particle trap, an oxygen sensor, an emission control system, a fuel system, an EGR (Exhaust Gas Recirculation), etc.

Currently, the OBD system is developed as software, a user can download the software integrated with the OBD system into a user equipment so as to implement vehicle detection. However, with the development of the society, enterprises pay more attention to the cost, and a development cost of software is higher and higher, since the OBD system in the form of software can be downloaded into the user equipment, thus, an opportunity for an illegal person to crack the software reversely is provided, and a safety of the vehicle detection will be seriously influenced due to piracy of software.

SUMMARY

The present disclosure provides a vehicle diagnosis method, a user equipment, a server and a vehicle diagnosis system, which can improve the safety of vehicle detection.

In a first aspect, the present disclosure provides a vehicle diagnosis method which is applicable to a user equipment, the vehicle diagnosis method comprises: receiving a login request from a user, wherein the login request includes a user identity information; sending the login request to a server, so that the server performs an authenticity verification for the user based on the user identity information, and returns a vehicle type selection data when a result of the authenticity verification is passed; displaying a vehicle type selection interface related to the vehicle type selection data on the user equipment; sending a corresponding vehicle type data to the server based on a vehicle type selected by the user on the vehicle type selection interface, so that the server returns the vehicle diagnosis interface data related to the vehicle type data; displaying a vehicle diagnosis interface related to the vehicle diagnosis interface data on the user equipment; sending a vehicle diagnosis instruction inputted by the user on the vehicle diagnosis interface to the server, so that the server controls a vehicle terminal associated with the user identity information to perform a corresponding vehicle diagnosis operation, and return a vehicle diagnosis operation result fed back by the vehicle terminal; and displaying the vehicle diagnosis operation result on the user equipment.

Based on the first aspect of the present disclosure, in a first possible implementation mode, said before receiving the login request of the user, the method further comprises: receiving a registration request of the user, wherein the registration request includes a device identifier and a registration password corresponding to the vehicle terminal; sending the registration request to the server, so that the server performs the authenticity verification for the vehicle terminal based on the device identification and the registration password, and returns registration input prompt information when the result of the authenticity verification is passed; sending the user identity information input by the user according to the registration input prompt information to the server, so that the server completes registration of the user; and receiving a registration completion indication information returned by the server, wherein the registration completion indication information is used for indicating that the registration of the user is completed.

A second aspect of the present disclosure provides a vehicle diagnosis method which is applicable to a server, the vehicle diagnosis method comprises: receiving a login request from a user equipment, wherein the login request includes user identity information; performing an authenticity verification for the user based on the user identity information, and sending the vehicle type selection data to the user equipment when a result of the authenticity verification is passed, so that the user equipment displays a vehicle type selection interface related to the vehicle type selection data, and returns a corresponding vehicle type data to the server based on a vehicle type selected by the user on the vehicle type selection interface; receiving vehicle type data from the user equipment, and sending the vehicle diagnosis interface data related to the vehicle type data to the user equipment, so that the user equipment displays the vehicle diagnosis interface related to the vehicle diagnosis interface data and returns a vehicle diagnosis instruction as input by a user on the vehicle diagnosis interface; and controlling the vehicle terminal associated with the user identity information to perform corresponding vehicle diagnosis operation, and sending a vehicle diagnosis operation result fed back by the vehicle terminal to the user equipment when the vehicle diagnosis instruction from the user equipment is received.

Based on the second aspect of the present disclosure, in a first possible implementation mode, said before receiving the login request from the user equipment, the method further comprises: receiving a registration request from the user equipment, wherein the registration request includes a device identifier and a registration password corresponding to the vehicle terminal; performing the authenticity verification on the vehicle terminal based on the device identifier and the registration password; sending a registration input prompt message to the user equipment if the result of the authenticity verification is passed, so that the user inputs the user identity information under the prompt of the registration input prompt information; completing registration of the user when the user identity information from the user equipment is received; and returning registration completion indication information to the user equipment, wherein the registration completion indication information is used for indicating that the registration of the user is completed.

Based on the first possible implementation mode of the second aspect of the present disclosure, in a second possible implementation mode, the user identity information includes an account name and a login password; said completing user registration when the user identity information from the user equipment is received particularly comprises: verifying authenticity of the account name and the login password when the user identity information from the user equipment is received; and storing the account name and the login password in association, and associating the account name with the vehicle terminal if the result of the authenticity verification is passed.

A third aspect of the present disclosure provides a user equipment comprising a memory, a processor and computer program stored in the memory and executable by the processor, the processor is configured to execute the computer program to implement steps of:

receiving a login request from a user, wherein the login request includes a user identity information;

sending the login request to a server, so that the server performs an authenticity verification for the user based on the user identity information, and returns a vehicle type selection data when a result of the authenticity verification is passed;

displaying a vehicle type selection interface related to the vehicle type selection data on a user equipment;

sending a corresponding vehicle type data to the server based on a vehicle type selected by the user on the vehicle type selection interface, so that the server returns the vehicle diagnosis interface data related to the vehicle type data;

displaying a vehicle diagnosis interface related to the vehicle diagnosis interface data on the user equipment;

sending a vehicle diagnosis instruction inputted by the user on the vehicle diagnosis interface to the server, so that the server controls a vehicle terminal associated with the user identity information to perform a corresponding vehicle diagnosis operation, and returns a vehicle diagnosis operation result as fed back by the vehicle terminal; and displaying the vehicle diagnosis operation result on the user equipment.

Based on the first aspect of the present disclosure, in a first possible implementation mode, the processor is further configured to execute the computer program to implement steps of:

before a step of receiving the login request of the user, receiving a registration request of the user, wherein the registration request includes a device identifier and a registration password corresponding to the vehicle terminal;

sending the registration request to the server, so that the server performs the authenticity verification for the vehicle terminal based on the device identification and the registration password, and returns registration input prompt information when a result of the authenticity verification is passed;

sending the user identity information input by the user according to the registration input prompt information to the server, so that the server completes registration of the user; and receiving a registration completion indication information returned by the server, wherein the registration completion indication information is used for indicating that the registration of the user is completed.

A fourth aspect of the present disclosure provides a server comprising a memory, a processor and computer program stored in the memory and executable by the processor, wherein the processor is configured to execute the computer program to implement steps of:

receiving a login request from a user equipment, wherein the login request includes user identity information;

performing an authenticity verification for the user based on the user identity information, and sending the vehicle type selection data to the user equipment when a result of the authenticity verification is passed, so that the user equipment displays a vehicle type selection interface related to the vehicle type selection data, and returns a corresponding vehicle type data to the server based on a vehicle type selected by the user on the vehicle type selection interface;

receiving vehicle type data from the user equipment, and sending the vehicle diagnosis interface data related to the vehicle type data to the user equipment, so that the user equipment displays the vehicle diagnosis interface related to the vehicle diagnosis interface data, and returns a vehicle diagnosis instruction as input by a user on the vehicle diagnosis interface; and controlling the vehicle terminal associated with the user identity information to perform corresponding vehicle diagnosis operation, and sending a vehicle diagnosis operation result fed back by the vehicle terminal to the user equipment when the vehicle diagnosis instruction from the user equipment is received.

Based on the fourth aspect of the present disclosure, in a first possible implementation mode, the processor is further configured to execute the computer program to implement steps of:

before said receiving the login request from the user equipment, receiving a registration request from the user equipment, wherein the registration request includes a device identifier and a registration password corresponding to the vehicle terminal;

performing the authenticity verification on the vehicle terminal based on the device identifier and the registration password;

sending a registration input prompt message to the user equipment if the result of the authenticity verification is passed, so that the user inputs the user identity information under the prompt of the registration input prompt information;

completing registration of the user when the user identity information from the user equipment is received; and returning registration completion indication information to the user equipment, wherein the registration completion indication information is used for indicating that the registration of the user is completed.

Based on the fourth aspect of the present disclosure, in a second possible implementation mode, the processor is further configured to execute the computer program to implement the step of completing user registration when the user identity information from the user equipment is received by verifying authenticity of the account name and the login password when the user identity information from the user equipment is received; and storing the account name and the login password in association, and associating the account name with the vehicle terminal if the result of the authenticity verification is passed.

In view of above, in the technical solution of the present disclosure, the login request of the user is sent to the server according to the user equipment, the server returns the vehicle type selection data after the authenticity of the user has been successfully verified, the user equipment displays relevant vehicle type selection interface based on the vehicle type selection data, and sends the corresponding vehicle type data to the server based on the vehicle type selected by the user on the vehicle type selection interface, a vehicle diagnosis interface related to the vehicle type data is returned by the server; when a vehicle diagnosis instruction as input by the user on the vehicle diagnosis interface is received, relevant vehicle terminal is controlled by the server to perform the corresponding vehicle diagnosis operation, then, the vehicle diagnosis operation result fed back by the vehicle terminal is displayed by the user equipment. Since transmission of the vehicle type selection interface and controlling of the vehicle terminal are executed by the server in the technical solution of the present disclosure, thus, the user can implement a vehicle detection just by interacting with the server through the user equipment, and needn't download the vehicular diagnosis system into the user equipment in the form of software. In this way, a probability that illegal persons reversely crack software can be reduced to a certain extent, and the safety of the vehicle detection is further improved.

BRIEF DESCRIPTION OF THE DRAWINGS

In order to describe the embodiments of the present invention or the technical solutions in the prior art more clearly, a brief introduction regarding the accompanying drawings that need to be used for describing the embodiments or the prior art is given below.

PREFERRED EMBODIMENTS OF THE PRESENT DISCLOSURE

In order to make the purpose, technical features and advantages of the present disclosure be more obvious and more understandable, technical solutions in the embodiments of the present disclosure will be described clearly and comprehensively with reference to accompanying drawings in the embodiments.

Figure 1:
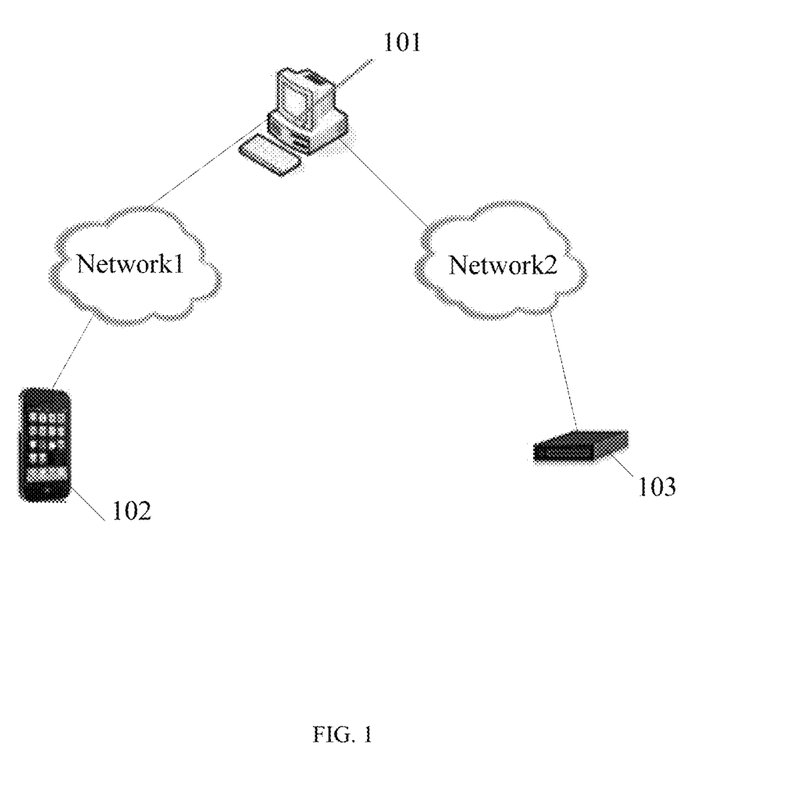
FIG. 1 illustrates a schematic view of a system architecture of a vehicle diagnosis method provided by the present disclosure.

A system architecture which applies a vehicle diagnosis method mentioned in the embodiment of the present disclosure is illustrated below, as shown in FIG. 1, FIG. 1 illustrates a schematic view of the system architecture which comprises:

a server 101; one or more user equipment(s) 102 connected with the server 101 (taking one user equipment as an example in FIG. 1); and one or more than two vehicle terminal(s) 103 connected with the server 102 (taking one vehicle terminal as an example in FIG. 1).

Particularly, as shown in FIG. 1, the server 101 and the user equipment 102 can be interconnected through a network 1, the server 101 and the vehicle terminal 103 can be interconnected through a network 2, the network 1 and the network 2 can belong to the same type of network, or as an alternative, the network 1 and the network 2 can also be different types of networks. Particularly, the user equipment 102 can be a mobile phone, a tablet computer, a wearable device and the like. The vehicle terminal 103 may be integrated in an OBD (On-board Diagnostic) interface module of a vehicle, or, the vehicle terminal 103 can also be a terminal which is independent and can be connected with an OBD interface of the vehicle, it is not limited herein.

In a particular application, the user equipment 102 may receive a login request of a user through an input interface of the user equipment 102 (e.g., a touch screen, a key or a voice recognition chip and the like), and then send the login request to a server 101 through a network, wherein the login request includes user identity information; when receiving the login request, the server 101 can perform an authenticity verification for the user based on the user identity information carried in the login request, and send the vehicle type selection data to the user equipment 102 through the network when a result of the authenticity verification is passed; the user equipment 102 can display a vehicle type selection interface related to the vehicle type selection data through a display screen, and send corresponding vehicle type data to the server 101 based on a vehicle type selected by the user on the vehicle type selection interface; when the server 101 receives the vehicle type data, it sends the vehicle diagnosis interface data related to the vehicle type data to the user equipment 102 through the network; the user equipment 101 displays a vehicle diagnosis interface related to the vehicle diagnosis interface data through the display screen, and send the vehicle diagnosis instruction as input by the user on the vehicle diagnosis interface to the server 101 through the network; when receiving a vehicle diagnosis instruction from the user equipment, the server 101 controls the vehicle terminal 103 corresponding to the user identity information to perform corresponding vehicle diagnosis operation, and sends a vehicle diagnosis operation result fed back by the vehicle terminal 103 to the user equipment 102; the user equipment 101 displays the vehicle diagnosis operation result through the di splay screen.

Figure 2:
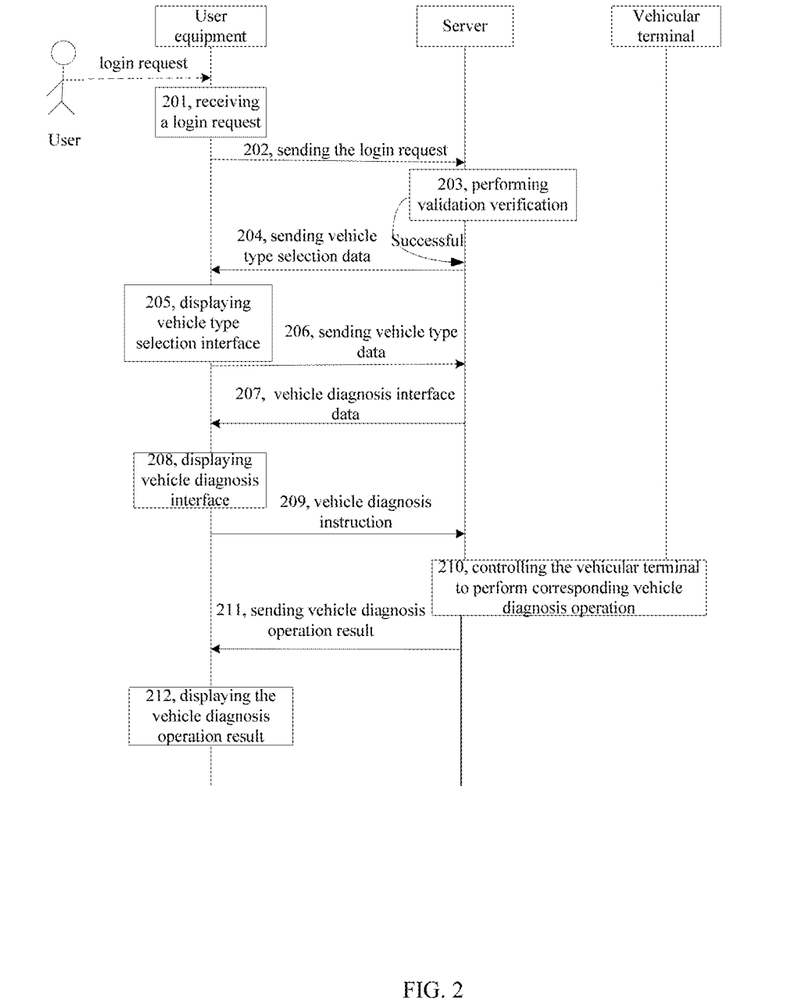
FIG. 2 illustrates a schematic flow chart of a vehicle diagnosis method provided by the present disclosure.

The vehicle diagnosis method provided by the embodiment of the present disclosure is described in detail with reference to the vehicle diagnosis method shown in FIG. 2. As shown in FIG. 2, the vehicle diagnosis method comprises following steps:

Step 201: receiving a login request of a user via the user equipment 102. Particularly, the user equipment 102 can receive a network access request as input by the user (e.g., the user can launch a browser of the user equipment 102, and then input a website into the browser, and trigger a connection to the website, thereby implementing an input of the network access request); the user equipment responds to the network access request and accesses a corresponding server through the network (namely, the server 101 mentioned in the application), the server 101 responds to the network access request and returns login interface data, the user equipment 102 displays a login interface related to the login interface data; at this time, the user can input user identity information through the login interface and initiate the login request. Optionally, the user identity information may include an account name and a login password, or as an alternative, the user identity information can also be fingerprint information or other information with identification characteristics, it is not limited herein.

Step 202: after receiving the login request, sending the login request to the server via the user equipment 102;

Step 203: after receiving the login request, performing an authenticity verification for the user based on the user identity information carried in the login request via the server 101 (that is, verifying whether the user identity information belongs to the registered user identity information or not).

Step 204: when the result of the authenticity verification is passed (i.e., it is determined that the user identity information belongs to the registered user identity information), sending the vehicle type selection data to the user equipment 102 via the server 101.

Step 205: after receiving the vehicle type selection data sent by the server 101, displaying a vehicle type selection interface related to the vehicle type selection data via the user equipment 102. For example, in a scene where the user interacts with the server 101 through the browser of the user equipment 102, the user equipment 102 can parse and render the vehicle type selection data sent by the server 101, and then display a vehicle type selection interface related to the vehicle type selection data on a corresponding interface of the browser. Particularly, the vehicle type selection interface comprises various types of selection controls, the user can select the vehicle type of the vehicle to be detected currently through the vehicle type selection interface.

Step 206, after the user selects the vehicle type through the vehicle type selection interface, returning corresponding vehicle type data to the server 101 based on the vehicle type selected by the user on the vehicle type selection interface via the user equipment 102. For example, when a user selects "2014 type of corolla" through the vehicle type selection interface, the user equipment 102 returns corresponding vehicle type data to the server 101, the vehicle type data indicates that the vehicle type selected by the user is the 2014 type of corolla.

Step 207: when receiving the vehicle type data from the user equipment 102, sending vehicle diagnosis interface data related to the vehicle type data to the user equipment 102 via the server 101. In the embodiment of the present disclosure, corresponding vehicle detection function modules can be pre-configured aiming at the characteristics of different types of vehicles; when the vehicle type data from the aforesaid user equipment 102 is received, the server 101 loads a vehicle detection function module corresponding to the vehicle type indicated by the vehicle type data, and generates corresponding vehicle diagnosis interface data according to the detection logic of the loaded vehicle detection function module, and then send the vehicle diagnosis interface data to the user equipment 102.

Step 208: when receiving the vehicle diagnosis interface data, displaying a vehicle diagnosis interface related to the vehicle diagnosis interface data via the user equipment 102. For example, in a scene where the user interacts with the server 101 through the browser of the user equipment 102, the user equipment 102 can parse and render the vehicle diagnosis interface data sent by the server 101, and then display a vehicle type selection interface related to the vehicle diagnosis interface data on a corresponding interface of the browser. The vehicle diagnosis interface can provide at least one input interface for inputting a vehicle diagnosis instruction, and different vehicle diagnosis instructions correspond to different vehicle diagnosis operations, so that the user can select a required vehicle detection item based on the input interface provided by the vehicle diagnosis interface; after the user selects the required vehicle detection item, it means that the corresponding vehicle diagnosis instruction is input.

Step 209, sending the vehicle diagnosis instruction as input by the user to the server 101 via the user equipment 102.

Step 210, when the vehicle diagnosis instruction from the user equipment 102 is received, controlling the vehicle terminal associated with the user identity information to perform the corresponding vehicle diagnosis operation via the user equipment 102. Particularly, after receiving the vehicle diagnosis instruction, the server 101 invokes a corresponding vehicle detection function module to parse the vehicle diagnosis instruction, and sends the parsed command to a vehicle terminal that is associated with the user identity information so as to control the vehicle terminal to perform the corresponding vehicle diagnosis operation. After the vehicle diagnosis operation has been performed by the vehicle terminal, the vehicle diagnosis operation result is returned to the server 101. It should be explained that, the association relationship between the user identity information and the vehicle terminal can be established by the user in a process (the registration process will be described in detail subsequently) in which the user submits a registration request to the server 102; or as an alternative, the association relationship between the user identity information and the vehicle terminal can also be established by a manufacturer, and when the vehicle terminal is sold by the manufacturer or a merchant, the user identity information associated with the vehicle terminal is sold with the vehicle terminal or notified to a user (i.e., a buyer), it is not limited herein.

Step 211: returning the vehicle diagnosis operation result to the user equipment via the server 102.

Step 212: when the vehicle diagnosis operation result is received by the user equipment 101, displaying the vehicle diagnosis operation result on the user equipment. Particularly, in a scene where the user interacts with the server 102 through the browser of the user equipment 101, the user equipment can parse and render the vehicle diagnosis operation result sent by the server 102, and display the vehicle diagnosis operation result on the corresponding interface of the browser, so that the user can check the vehicle diagnosis operation result.

In the vehicle diagnosis method as shown in FIG. 2, the login request of the user is sent to the server 102 according to the user equipment 101, the server 102 returns the vehicle type selection data after the authenticity of the user has been successfully verified, the user equipment 101 displays relevant vehicle type selection interface based on the vehicle type selection data, and sends the corresponding vehicle type data to the server based on the vehicle type selected by the user on the vehicle type selection interface, a vehicle diagnosis interface related to the vehicle type data is returned by the server 102; when a vehicle diagnosis instruction as input by the user on the vehicle diagnosis interface is received, relevant vehicle terminal is controlled by the server 102 to perform the corresponding vehicle diagnosis operation, then, the vehicle diagnosis operation result fed back by the vehicle terminal is displayed by the user equipment. Since transmission of the vehicle type selection interface and controlling of the vehicle terminal are executed by the server 102 in the present solution, thus, the user can implement vehicle detection just by interacting with the server 102 through the user equipment 102, and needn't download the vehicular diagnosis system into the user equipment in the form of software. In this way, a probability that illegal persons reversely crack software can be reduced to a certain extent, and the safety of the vehicle detection is further improved.

As mentioned above, the association relationship between the user identity information and the vehicle terminal can be established in the process that the user initiates a registration request to the server, that is, the user can submit a registration request to the server through the user equipment, after the registration is completed, a subsequent user can log in the server by using the successfully registered user identity information so as to perform a detection for the vehicle. The aforesaid registration process is described in detail in the following with reference to a schematic view of registration of vehicle detection as shown in FIG. 3.

Figure 3:
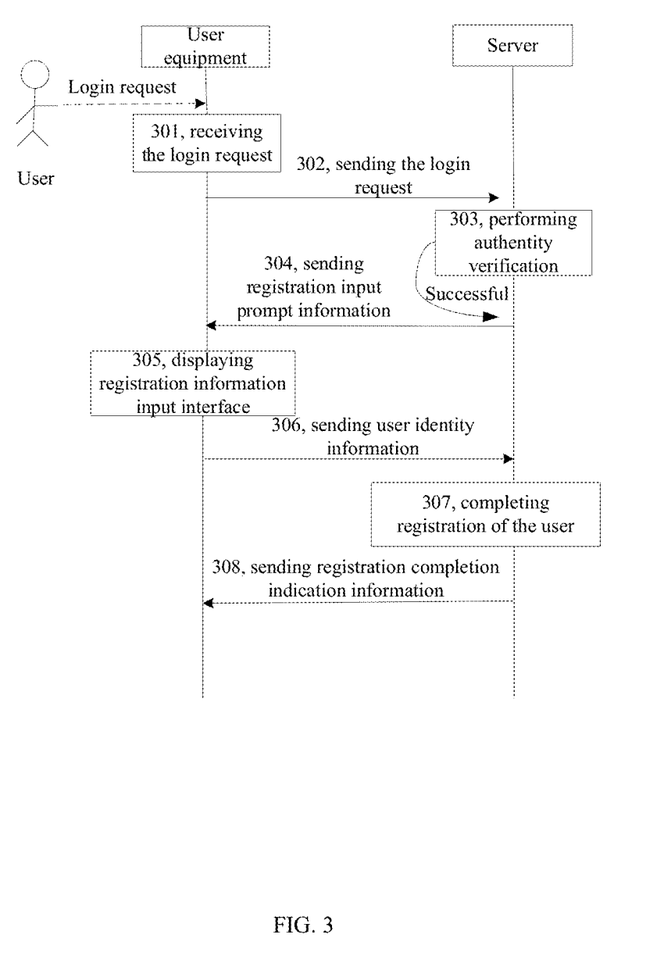
FIG. 3 illustrates a schematic flow chart of registration provided by the present disclosure.

As shown in FIG. 3, said registration process comprises:
step 301, receiving a registration request of a user via the user equipment 102. Particularly, the user equipment 102 can receive a network access request as input by the user (e.g., the user can launch a browser of the user equipment 102 firstly, and then input a website into the browser and triggers a connection to the website so as to implement an input of the network access request) firstly, the user equipment responds to the network access request and accesses a corresponding server through a network (that is, the server 101 mentioned in the present disclosure), the server 101 responds to the network access request and returns login interface data, the user equipment 102 displays a login interface related to the login interface data, and the login interface is also provided with a registration entry, for unregistered users, these users can initiate a registration request through the registration entry. The aforesaid registration request comprises a device identifier and a registration password corresponding to the vehicle terminal, the vehicle terminal is the vehicle terminal to be associated with the user. In the embodiment of the present disclosure, each vehicle terminal is configured with a device identifier and a registration password, and the device identifier corresponds to the registration password one-to-one, the identity of the device is an identifier that indicates uniqueness of the identity of the device, and can be, for example, a serial number. The device identifier and the registration password may be encapsulated in a housing of the vehicle terminal (e.g., printed on the housing of the vehicle terminal in the form of two-dimensional code, so that the user can obtain the device identification and the registration password of the vehicle terminal by scanning the two-dimensional code), or as an alternative, the device identification and the registration password can also be printed on a user manual of the vehicle terminal or other documents sold with the vehicle terminal when leaving the factory, it is not limited herein.

Step 302, after receiving the registration request, sending the registration request to the server 101 via the user equipment 102.

Step 303, after receiving the registration request, performing the authenticity verification for the vehicle terminal based on the device identifier and the registration password carried in the registration request (that is, checking whether the vehicle terminal can be matched with the device identifier and the registration password based on the device identifier and the registration password).

Step 304, sending a registration input prompt message to the user equipment 102 when the result of the authenticity verification is passed (that is, the vehicle terminal can be matched with the device identifier and the registration password based on the device identifier and the registration password).

Step 305, displaying a registration information input interface related to the registration input prompt information when the user equipment 102 receives the registration input prompt information, so that a user can input the user identity information (e.g., an account name and a login password used for logging in) through the registration information input interface. For example, in a scene where the user interacts with the server 101 through the browser of the user equipment 102, the user equipment 102 can parse and render the registration input prompt information sent by the server 101, and then display the registration information input interface related to the registration input prompt information on the corresponding interface of the browser.

Step 306, sending the user identity information inputted by the user according to the registration input prompt information to the server 101 via the user equipment 102.

Step 307, completing the registration of the user via the server 101 when the aforesaid server 101 receives the aforesaid user identity information. Particularly, the server 101 registers the user identity information in a book, and associates the user identity information with the vehicle terminal indicated by the registration request (i.e., establishing the association relationship between the user identity information and the vehicle terminal). Optionally, in a scene where the user identity information includes the account name and the login password, when receiving the user identity information, the server 101 can perform an authenticity verification for the account name and the login password accurately, when the result of the authenticity verification is passed, the account name and the login password are stored in association (i.e., registered in a book) and the account name is associated with the vehicle terminal indicated by the registration request, thereby completing the registration. When the result of the authenticity verification is false, a registration error information indicating that the registration information is faulty can be returned to the user equipment 102; when the registration error information is received by the user equipment 102, the user can be prompted to re-input the user identity information based on the registration error information, or, this registration process can be stopped. Particularly, said performing authenticity verification for the account name and the login password can comprise: checking whether the account name and the login password are all in accordance with a preset format (for example, the account name is set that it can't comprise special characters such as "#", "@", "*" and so on, the length of the login password needs to be within 8-12 bits, and the login password contains numbers and letters at the same time), if the account name and the login password are all in accordance with a preset format, whether the account name has been registered in the book is checked, if the account name has been registered in the book, the result of the authenticity verification is determined to be false, if the account name is not registered in the book, the result of the current authenticity verification is determined to be true.

Step 308, returning registration completion indication information to the user equipment 102 via the server 101 after the registration of the user is completed, the registration completion indication information is used for indicating that the registration of the user has been completed, so that the user can get to know that the registration has been completed currently through the user equipment 101.

After the registration is completed, the user can log in the server 101 by using the registered user identity information according to the registered user, thereby performing a diagnosis for the vehicle. Particularly, regarding the step of logging in the server 101 by using the user identity information which has been successfully registered and performing the diagnosis for the vehicle, reference can be made to the descriptions in the embodiment as shown in FIG. 2, and it is not repeatedly described herein.

In the registration process as shown in FIG. 3, the registration request of the user is sent to the server 101 through the user equipment 102, the server 101 returns the registration input prompt information after the authenticity of the vehicle terminal to be registered has been verified successfully, the user equipment 102 displays relevant registration information input interface based on the registration input prompt information, and completes registration of the user based on the user identity information input by the user on the registration information input interface. Due to the fact that the authenticity of the vehicle terminal is verified in the registration process, the user can be prevented from using an illegal vehicle terminal to perform the registration, thereby bringing hidden danger to vehicle detection, so that the safety of vehicle detection can be improved to a certain extent.

Figure 4:
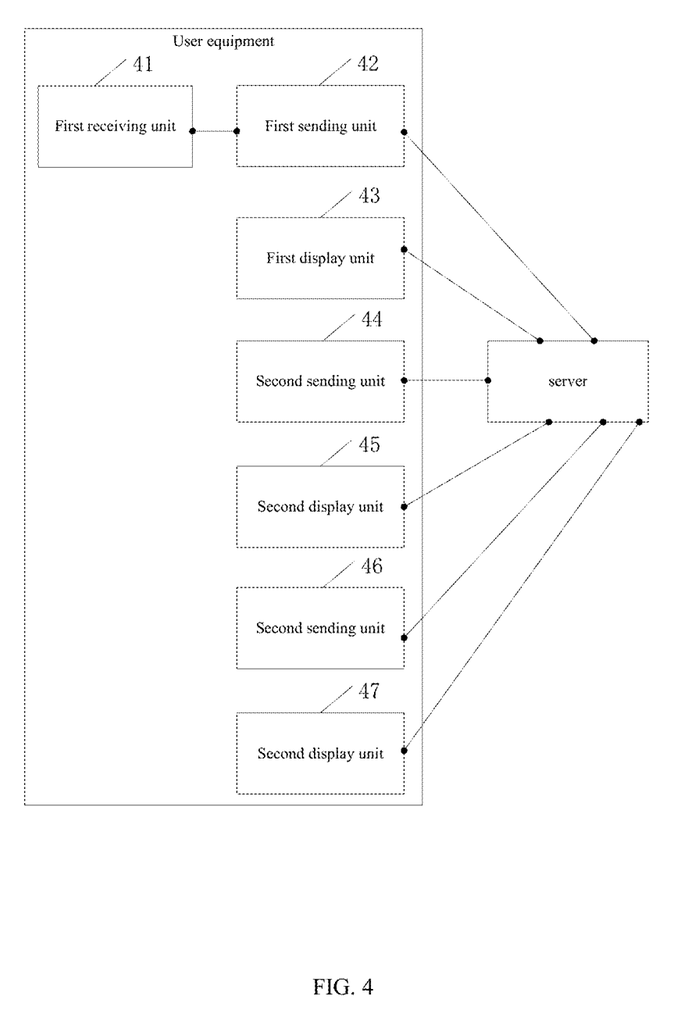
FIG. 4 illustrates a structural schematic view of one user equipment provided by the present disclosure.

The structure of the user equipment 102 mentioned in the aforesaid method embodiment is described by one embodiment below, as shown in FIG. 4, the user equipment 102 comprises:

a first receiving unit 41 configured to receive a login request of a user, wherein the login request includes user identity information;

a first sending unit 42 configured to send the login request to a server 101, so that the server 102 can perform authenticity verification for the user based on the user identity information, and return vehicle type selection data when a result of the authenticity verification is passed;

a first display unit 43 configured to display a vehicle type selection interface related to the vehicle type selection data on the user equipment;

a second sending unit 44 configured to send corresponding vehicle type data to the server 101 based on a vehicle type selected by the user on the vehicle type selection interface, so that the server 101 can return vehicle diagnosis interface data related to the vehicle type data;

a second display unit 45 configured to display a vehicle diagnosis interface related to the vehicle diagnosis interface data on the user equipment 102;

a third sending unit 46 configured to send a vehicle diagnosis instruction input by a user on the vehicle diagnosis interface to the server 101, so that the server 101 can control the vehicle terminal associated with the user identity information to perform corresponding vehicle diagnosis operation, and return a vehicle diagnosis operation result fed back by the vehicle terminal; and a third display unit 47 configured to display the vehicle diagnosis operation result on the user equipment 102.

Optionally, the user equipment 102 in this embodiment of the present disclosure further comprises:

a second receiving unit configured to receive a registration request of the user before the first receiving unit receives the login request, wherein the registration request includes a device identifier and a registration password corresponding to the vehicle terminal;

a fourth sending unit configured to send the registration request to the server 101, so that the server 101 can perform the authenticity verification on the vehicle terminal based on the device identification and the registration password, and return registration input prompt information when the result of the authenticity verification is passed;

a fifth sending unit configured to send the user identity information as input by the user according to the registration input prompt information to the server 101, so that the server 101 can complete registration of the user; and a third receiving unit configured to receive registration completion indication information returned by the server 101, wherein the registration completion indication information is used for indicating that the registration of the user is completed.

It should be understood that, the user equipment 102 in the embodiments of the present disclosure can be used for implementing all technical solutions executed by the user equipment 102 in the aforesaid method embodiment, functionalities of each function module can be realized specifically according to the method in the method embodiment, a specific implementation process can be described with reference to the related description in the method embodiment mentioned above; moreover, regarding the part of the present disclosure which are not described in detail in this embodiment of the present disclosure, reference can be made to the description of the method embodiment, and it is not repeatedly described herein.

Figure 5:
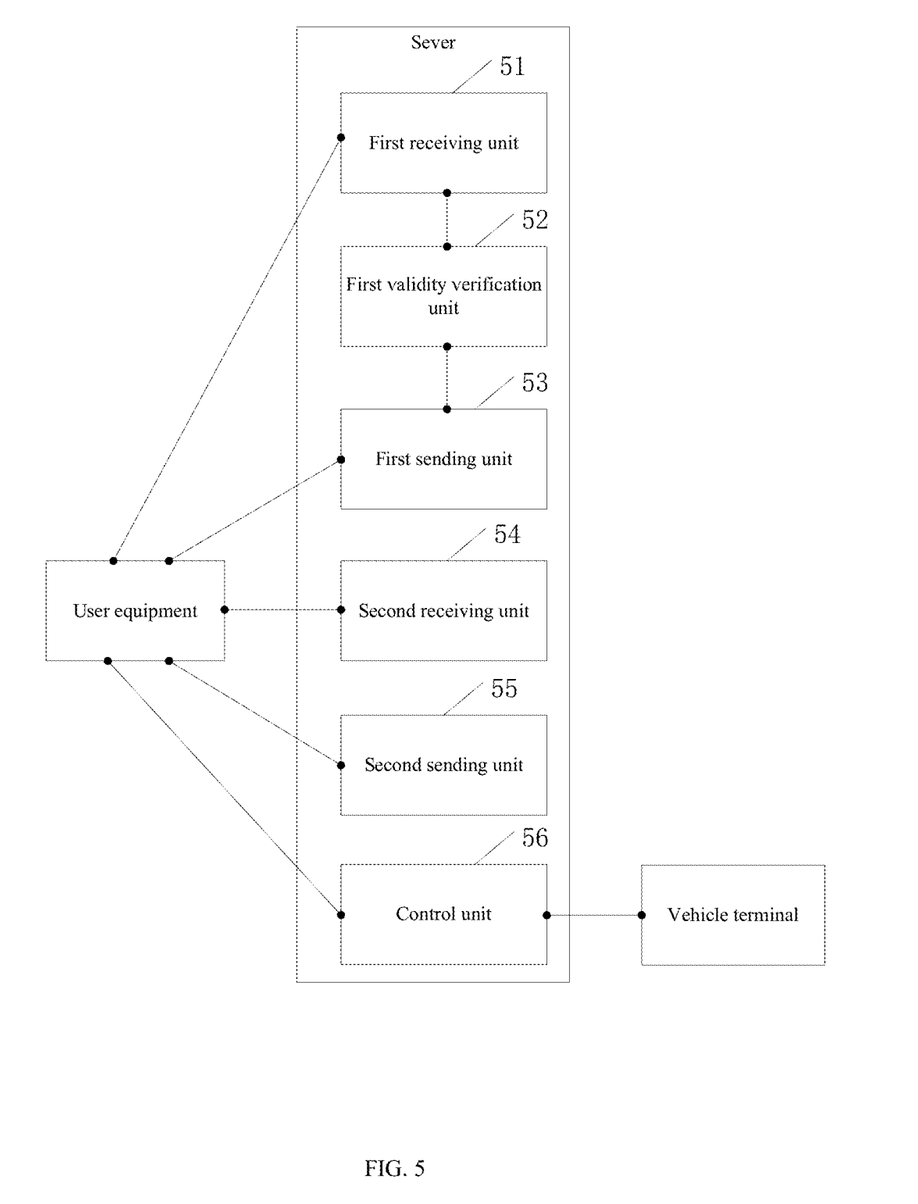
FIG. 5 illustrates a structural schematic view of one server provided by the present disclosure.

The structure of the server 101 mentioned in the method embodiment is described by one embodiment below, as shown in FIG. 5, the server 101 comprises:

a first receiving unit 51 configured to receive a login request from a user equipment 102, wherein the login request includes user identity information;

a first authenticity verification unit 52 configured to perform an authenticity verification for a user based on the user identity information;

a first sending unit 53 configured to send vehicle type selection data to the user equipment 102 when a result of verification of the first authenticity verification unit is true, so that the user equipment 102 can display a vehicle type selection interface related to the vehicle type selection data, and return corresponding vehicle type data to the server 101 based on the vehicle type selected by the user on the vehicle type selection interface;

a second receiving unit 54 configured to receive the vehicle type data from the user equipment 102;

a second sending unit 55 configured to send vehicle diagnosis interface data related to the vehicle type data to the user equipment 102, so that the user equipment 102 can display a vehicle diagnosis interface related to the vehicle diagnosis interface data and return a vehicle diagnosis instruction as input by a user on the vehicle diagnosis interface; and a control unit 56 configured to control the vehicle terminal associated with the user identity information to perform corresponding vehicle diagnosis operation when receiving the vehicle diagnosis instruction from the user equipment 102, and send a vehicle diagnosis operation result fed back by the vehicle terminal to the user equipment 102.

Optionally, the server 101 in the embodiment of the present disclosure further comprises:

a third receiving unit configured to receive a registration request from the user equipment 102 before receiving the login request, wherein the registration request includes a device identifier and a registration password corresponding to the vehicle terminal;

a second authenticity verification unit configured to perform authenticity verification on the vehicle terminal based on the device identification and the registration password;

a third sending unit configured to send registration input prompt information to the user equipment 102 when a result of verification of the second authenticity verification unit is true, so that the user can input the user identity information under the prompt of the registration input prompt information;

a registration unit configured to complete registration of the user when receiving the user identity information from the user equipment; and a fourth sending unit configured to return the registration completion indication information to the user equipment 102, wherein the registration completion indication information is used for indicating that the registration of the user is completed.

Optionally, the aforesaid user identity information comprises an account name and a login password;

The aforesaid registration unit comprises: an authenticity verification unit configured to verify the authenticity of the account name and the login password when receiving the user identity information from the user equipment 102; and an associative storage unit configured to store the account name and the login password in association when the result of the authenticity verification unit is true, and associate the account name with the vehicle terminal.

It should be understood that the server 101 in the embodiments of the present disclosure can be used for implementing all technical solutions executed by the server 101 in the method embodiment, the functionalities of each function module can be realized according to the method in the method embodiment, a specific implementation process can be described with reference to the related description in the method embodiment mentioned above; moreover, regarding the part of the present disclosure which are not described in detail in the embodiments of the present disclosure, reference can be made to the descriptions of the method embodiment, it is not repeatedly described herein.

The structure of the user equipment 102 mentioned in the method embodiment is described by another embodiment below, please refer to FIG. 6, the user equipment 102 in the embodiment of the present disclosure comprises: a memory 601, one or more processors 602 (only one processor is shown in FIG. 1) and computer program which is stored in the memory 601 and is executable by the processor 602. Wherein, the memory 601 is configured to store software program and modules, the processor 602 is configured to perform various functional applications and data processing by executing the software program and units stored in the memory 601. Particularly, the processor 602 implements the following steps by executing the computer program stored in the memory 601:

receiving a login request of a user, wherein the login request includes user identity information;

sending the login request to a server 101, so that the server 101 can perform authenticity verification for the user based on the user identity information, and return vehicle type selection data when a result of the authenticity verification is passed;

displaying a vehicle type selection interface related to the vehicle type selection data on a user equipment 102;

sending the corresponding vehicle type data to the server 101 based on vehicle type selected by the user on the vehicle type selection interface, so that the server 101 can return vehicle diagnosis interface data related to the vehicle type data;

displaying a vehicle diagnosis interface related to the vehicle diagnosis interface data on the user equipment 102;

sending a vehicle diagnosis instruction as input by a user on the vehicle diagnosis interface to the server 101, so that the server 101 can control the vehicle terminal associated with the user identity information to perform corresponding vehicle diagnosis operation, and return a vehicle diagnosis operation result fed back by the vehicle terminal; and displaying the vehicle diagnosis operation result on the user equipment 102.

Assuming that aforesaid steps are a first possible implementation mode, then, in the second possible implementation mode which is provided on the basis of the first possible implementation mode, before receiving the login request of the user, the processor 602 further implements the following steps by executing the computer program stored in the memory 601:

receiving a registration request of a user, wherein the registration request includes a device identifier and a registration password corresponding to the vehicle terminal;

sending the registration request to the server 101, so that the server 101 can perform authenticity verification on the vehicle terminal based on the device identification and the registration password, and return registration input prompt information when a result of the authenticity verification is passed;

sending the user identity information as input by the user according to the registration input prompt information to the server 101, so that the server 101 can complete registration of the user; and receiving registration completion indication information returned by the server 101, wherein the registration completion indication information is used for indicating that the registration of the user is completed.

Figure 6:
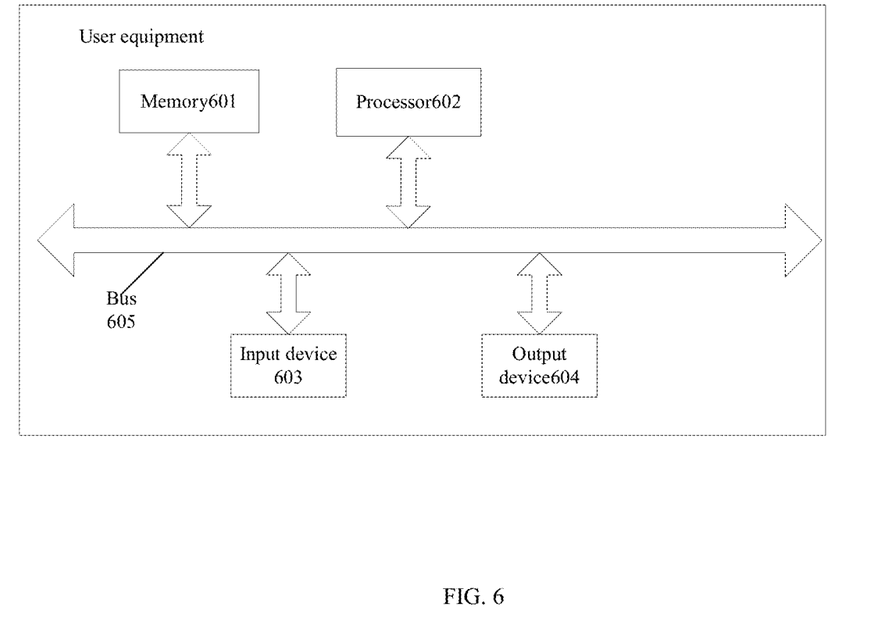
FIG. 6 illustrates a schematic view of another user equipment provided by the present disclosure.

Optionally, as shown in FIG. 6, the aforesaid device can also include: one or more input device(s) 603 (only one input device 603 is shown in FIG. 6), and one or more output device(s) 604 (only one output device 604 is shown in FIG. 6). A memory 601, a processor 602, the input device 603 and the output device 604 are connected via a bus 605.

It should be understood that, in the embodiment of the present disclosure, the so called processor 602 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The input device 603 can include a keyboard, a touchpad, a fingerprint collection sensor (which is used for collecting fingerprint information and direction information of fingerprint of the user), microphone, etc., the output device 604 can include a display device, a loudspeaker, etc.

The memory 604 can include ROM (Read Only Memory) and RAM (Random Access Memory), and is configured to provide instructions and data for the processor 601. A part or a whole of the memory 604 can also include NVRAM (Non-volatile Random Access Memory).

It should be understood that the user equipment 102 in the embodiments of the present disclosure can be used for implementing all technical solutions executed by the user equipment 102 in the method embodiment, the functionalities of each function module can be realized according to the method in the method embodiment, a specific implementation process can be described with reference to the related description in the method embodiment mentioned above; moreover, regarding the part of the present disclosure which are not described in detail in the embodiments of the present disclosure, reference can be made to the descriptions of the method embodiment, it is not repeatedly described herein.

Figure 7:
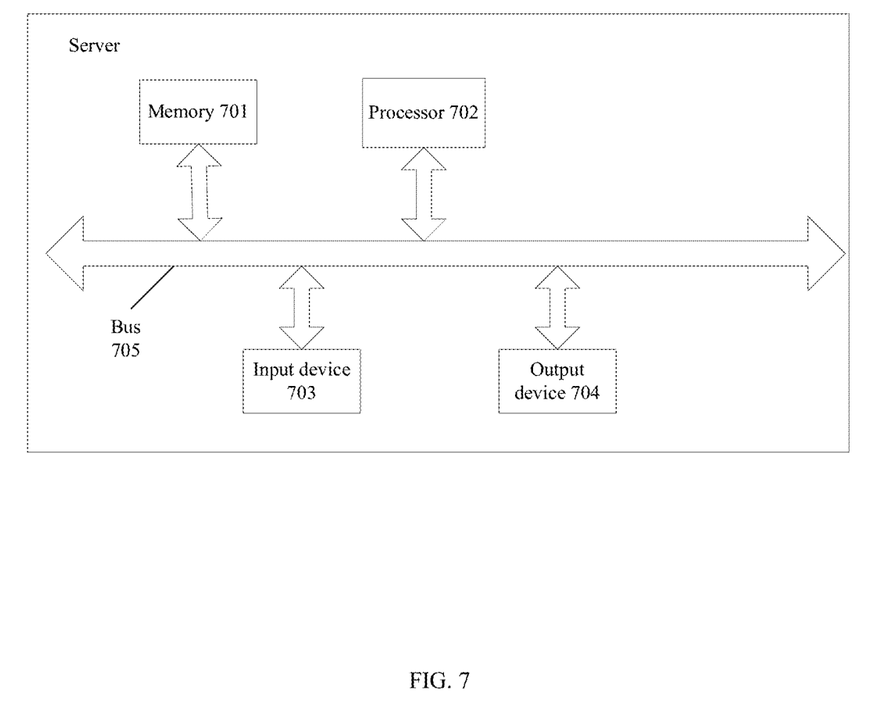
FIG. 7 illustrates a structural schematic view of another server provided by the present disclosure.

The structure of the server 101 mentioned in the method embodiment is described by another embodiment below, please refer to FIG. 7, the server 101 comprises a memory 701, one or more processor(s) 702 (only one processor 702 is shown in FIG. 7) and computer program which is stored in the memory 701 and is executable by the processor 702. The memory 701 is used for storing software program and modules, the processor 702 performs various functional applications and data processing by executing the software program and units stored in the memory 701. Particularly, the processor 702 implements the following steps by executing the computer program stored in the memory 701:

receiving a login request from a user equipment 102, wherein the login request includes user identity information;

performing an authenticity verification for the user based on the user identity information, and sending vehicle type selection data to the user equipment 102 when a result of the authenticity verification is passed, so that the user equipment 102 can display a vehicle type selection interface related to the vehicle type selection data, and return corresponding vehicle type data to the server 101 based on a vehicle type selected by the user on the vehicle type selection interface;

receiving the vehicle type data from the user equipment 102, and sending vehicle diagnosis interface data related to the vehicle type data to the user equipment 102, so that the user equipment 102 can display a vehicle diagnosis interface related to the vehicle diagnosis interface data and return a vehicle diagnosis instruction as input by a user on the vehicle diagnosis interface;

controlling the vehicle terminal associated with the user identity information to perform corresponding vehicle diagnosis operation when a vehicle diagnosis instruction from the user equipment 102 is received, and sending a vehicle diagnosis operation result fed back by the vehicle terminal to the user equipment 102.

Assuming that the aforesaid description is a first possible implementation mode, then, in the second possible implementation mode which is provided on the basis of the first possible implementation mode, before receiving the login request from the user equipment 102, the processor 702 further implements the following steps by executing the computer program stored in the memory 701:

receiving a registration request from the user equipment 102, wherein the registration request includes a device identifier and a registration password corresponding to the vehicle terminal;

performing an authenticity verification on the vehicle terminal based on the device identification and the registration password;

sending registration input prompt information to the user equipment 102 if a result of the authenticity verification is passed, so that the user can input user identity information under the prompt of the registration input prompt information;

completing registration of the user when receiving the user identity information from the user equipment 102; and returning registration completion indication information to the user equipment 102, wherein the registration completion indication information is used for indicating that the registration of the user is completed.

In the third possible implementation mode which is provided on the basis of the aforesaid second possible implementation mode, the user identity information includes an account name and a login password; said completing the registration of the user when receiving the user identity information from the user equipment 102 particularly comprises:

verifying the authenticity of the account name and the login password when the user identity information from the user equipment is received;

storing the account name and the login password in association and associating the account name with the vehicle terminal when a result of authenticity verification is passed.

Optionally, as shown in FIG. 7, the aforesaid server 101 can further comprise: one or more input device(s) 703 (only one of which is shown in FIG. 7) and one or more output devices 704 (only one of which is shown in FIG. 7). The memory 701, the processor 702, the input device 703 and the output device 704 are connected through a bus 705.

It should be understood that, in the embodiment of the present disclosure, the so called processor 702 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The input device 703 can include a keyboard, a touchpad, a fingerprint collection sensor (used for collecting fingerprint information and direction information of fingerprint of the user), microphone, etc., the output device 704 can include a display device, a loudspeaker, etc.

The memory 704 can include ROM (Read Only Memory) and RAM (Random Access Memory), and is configured to provide instructions and data for the processor 701. A part or a whole of the memory 704 can also include NVRAM (Non-volatile Random Access Memory).

It should be understood that the server 101 in the embodiments of the present disclosure can be used for implementing all technical solutions executed by the server 101 in the method embodiment, the functionalities of each function module can be realized according to the method in the method embodiment, a specific implementation process can be described with reference to the related description in the method embodiment mentioned above; moreover, regarding the part of the present disclosure which are not described in detail in the embodiments of the present disclosure, reference can be made to the descriptions of the method embodiment, it is not repeatedly described herein.

Figure 8:
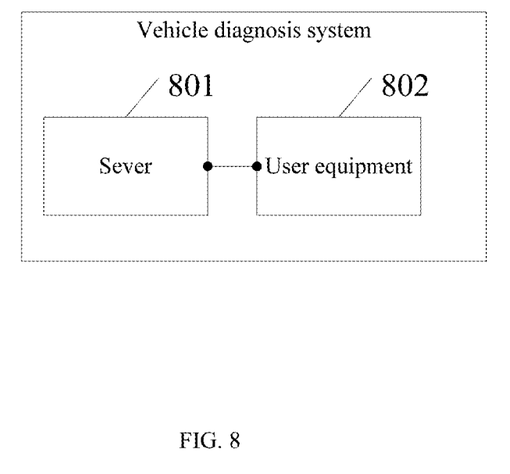
FIG. 8 illustrates a structural schematic view of a vehicle diagnosis system provided by the present disclosure.

A vehicle diagnosis system provided by the present disclosure is described according to an embodiment, as shown in FIG. 8, the vehicle diagnosis system comprises:

a server 801 and a user equipment 802.

Wherein, the user equipment 802 is configured to receive a login request of a user, the login request includes user identity information; the login request is sent to the server 801;

the server 801 is configured to perform an authenticity verification for the user based on the user identity information, and send vehicle type selection data to the user equipment 802 when a result of the authenticity verification is passed;

the user equipment 802 is further configured to display a vehicle type selection interface related to the vehicle type selection data, and send corresponding vehicle type data to the server 801 based on a vehicle type selected by the user on the vehicle type selection interface;

the server 801 is further configured to send vehicle diagnosis interface data related to the vehicle type data to the user equipment 802, display a vehicle diagnosis interface related to the vehicle diagnosis interface data, and send a vehicle diagnosis instruction as input by a user on the vehicle diagnosis interface to the server 801;

the server 801 is further configured to control the vehicle terminal corresponding to the user identity information to perform corresponding vehicle diagnosis operation and sending vehicle diagnosis operation result fed back by the vehicle terminal to the user equipment 802 when receiving a vehicle diagnosis instruction from the user equipment 802;

the user equipment 802 is further configured to display the vehicle diagnosis operation result.

In the embodiment of the invention, the user equipment 802 can be a mobile phone, a tablet computer, a wearable device and the like. The aforesaid vehicle terminal can be integrated in an OBD (On-board Diagnostic) interface module of a vehicle, or, the vehicle terminal can also be a terminal which is independent and can be connected with an OBD interface of the vehicle, it is not limited herein.

It should be understood that the user equipment and the server in the embodiments of the present disclosure can be used for implementing all technical solutions in the method embodiment, the functionalities of each function module can be realized according to the method in the method embodiment, a specific implementation process can be described with reference to the related description in the method embodiment mentioned above; moreover, regarding the part of the present disclosure which are not described in detail in the embodiments of the present disclosure, reference can be made to the descriptions of the method embodiment, it is not repeatedly described herein.

It can be clearly understood by one or ordinary skill in the art that, for describing conveniently and concisely, dividing of the aforesaid various functional units, functional modules is exemplified merely, in an actual application, the aforesaid functions can be assigned to different functional units and functional modules to be accomplished, that is, an inner structure of the aforesaid device is divided into functional units or modules so as to accomplish the whole or a part of functionalities described above.

In the embodiments mentioned above, the descriptions of the embodiments in the present invention are emphasized respectively, in regard to the part without detailed description in some embodiments, please refer to related description in other embodiments.

One of ordinary skill in the art will notice that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The professionals could use different methods to implement the described functions for each particular application, but such implementations should not be considered as going beyond the scope of the present disclosure.

A whole or part of flow process for implementing the method in the aforesaid embodiments of the present disclosure can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

The aforesaid embodiments are only intended to explain but not to limit the technical solutions of the present disclosure. Although the present disclosure has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements, which won't make the essential of corresponding technical solution to be broken away from the spirit and the scope of the technical solution in various embodiments of the present disclosure, should all be included in the protection scope of the present disclosure.

What is claimed is:

1. A vehicle diagnosis method which is applicable to a user equipment, wherein the vehicle diagnosis method comprises:
   receiving a login request from a user, wherein the login request includes a user identity information;
   sending the login request to a server, so that the server performs an authenticity verification for the user based on the user identity information, and returns a vehicle type selection data when a result of the authenticity verification is passed;
   displaying a vehicle type selection interface related to the vehicle type selection data on the user equipment;
   sending a corresponding vehicle type data to the server based on a vehicle type selected by the user on the vehicle type selection interface, so that the server returns the vehicle diagnosis interface data related to the vehicle type data;
   displaying a vehicle diagnosis interface related to the vehicle diagnosis interface data on the user equipment;
   sending a vehicle diagnosis instruction inputted by the user on the vehicle diagnosis interface to the server, so that the server parses the vehicle diagnosis instruction and sends a parsed command to a vehicle terminal associated with the user identity information to control the vehicle terminal to perform a corresponding vehicle diagnosis operation, and returns a vehicle diagnosis operation result as fed back by the vehicle terminal to the user equipment; and
   displaying the vehicle diagnosis operation result on the user equipment.

2. The vehicle diagnosis method according to claim 1, wherein before said receiving the login request of the user, the method further comprises:
   receiving a registration request of the user, wherein the registration request includes a device identifier and a registration password corresponding to the vehicle terminal;
   sending the registration request to the server, so that the server performs the authenticity verification for the vehicle terminal based on the device identification and the registration password, and returns registration input prompt information when a result of the authenticity verification is passed;
   sending the user identity information input by the user according to the registration input prompt information to the server, so that the server completes registration of the user; and
   receiving a registration completion indication information returned by the server, wherein the registration completion indication information is used for indicating that the registration of the user is completed.

3. A vehicle diagnosis method which is applicable to a server, wherein the vehicle diagnosis method comprises:
   receiving a login request from a user equipment, wherein the login request includes user identity information;
   performing an authenticity verification for the user based on the user identity information, and sending the vehicle type selection data to the user equipment when a result of the authenticity verification is passed, so that the user equipment displays a vehicle type selection interface related to the vehicle type selection data, and returns a corresponding vehicle type data to the server based on a vehicle type selected by the user on the vehicle type selection interface;

receiving vehicle type data from the user equipment, and sending the vehicle diagnosis interface data related to the vehicle type data to the user equipment, so that the user equipment displays the vehicle diagnosis interface related to the vehicle diagnosis interface data, and returns a vehicle diagnosis instruction as input by a user on the vehicle diagnosis interface; and parsing the vehicle diagnosis instruction and sending a parsed command to a vehicle terminal associated with the user identity information to control the vehicle terminal to perform corresponding vehicle diagnosis operation, and sending a vehicle diagnosis operation result fed back by the vehicle terminal to the user equipment when the vehicle diagnosis instruction from the user equipment is received.

4. The vehicle diagnosis method according to claim 3, wherein before said receiving the login request from the user equipment, the method further comprises:

receiving a registration request from the user equipment, wherein the registration request includes a device identifier and a registration password corresponding to the vehicle terminal;

performing the authenticity verification on the vehicle terminal based on the device identifier and the registration password;

sending a registration input prompt message to the user equipment if the result of the authenticity verification is passed, so that the user inputs the user identity information under the prompt of the registration input prompt information;

completing registration of the user when the user identity information from the user equipment is received; and returning registration completion indication information to the user equipment, wherein the registration completion indication information is used for indicating that the registration of the user is completed.

5. The vehicle diagnosis method according to claim 4, wherein the user identity information includes an account name and a login password; said completing user registration when the user identity information from the user equipment is received comprises:

verifying authenticity of the account name and the login password when the user identity information from the user equipment is received; and storing the account name and the login password in association, and associating the account name with the vehicle terminal if the result of the authenticity verification is passed.

6. A user equipment, comprising a memory, a processor and a computer program stored in the memory and executable by the processor, wherein the processor is configured to execute the computer program to implement steps of:

receiving a login request from a user, wherein the login request includes a user identity information;

sending the login request to a server, so that the server performs an authenticity verification for the user based on the user identity information, and returns a vehicle type selection data when a result of the authenticity verification is passed;

displaying a vehicle type selection interface related to the vehicle type selection data on a user equipment;

sending a corresponding vehicle type data to the server based on a vehicle type selected by the user on the vehicle type selection interface, so that the server returns the vehicle diagnosis interface data related to the vehicle type data;

displaying a vehicle diagnosis interface related to the vehicle diagnosis interface data on the user equipment;

sending a vehicle diagnosis instruction inputted by the user on the vehicle diagnosis interface to the server, so that the server parses the vehicle diagnosis instruction and sends a parsed command to a vehicle terminal associated with the user identity information to control the vehicle terminal to perform a corresponding vehicle diagnosis operation, and returns a vehicle diagnosis operation result as fed back by the vehicle terminal to the user equipment; and displaying the vehicle diagnosis operation result on the user equipment.

7. A server, comprising a memory, a processor and computer program stored in the memory and executable by the processor, wherein the processor is configured to execute the computer program to implement steps of:

receiving a login request from a user equipment, wherein the login request includes user identity information;

performing an authenticity verification for the user based on the user identity information, and sending the vehicle type selection data to the user equipment when a result of the authenticity verification is passed, so that the user equipment displays a vehicle type selection interface related to the vehicle type selection data, and returns a corresponding vehicle type data to the server based on a vehicle type selected by the user on the vehicle type selection interface;

receiving vehicle type data from the user equipment, and sending the vehicle diagnosis interface data related to the vehicle type data to the user equipment, so that the user equipment displays the vehicle diagnosis interface related to the vehicle diagnosis interface data, and returns a vehicle diagnosis instruction as input by a user on the vehicle diagnosis interface; and parsing the vehicle diagnosis instruction and sending a parsed command to a vehicle terminal associated with the user identity information to control the vehicle terminal to perform corresponding vehicle diagnosis operation, and sending a vehicle diagnosis operation result fed back by the vehicle terminal to the user equipment, when the vehicle diagnosis instruction from the user equipment is received.

8. The user equipment according to claim 6, wherein the processor is further configured to execute the computer program to implement steps of:

before a step of receiving the login request of the user, receiving a registration request of the user, wherein the registration request includes a device identifier and a registration password corresponding to the vehicle terminal;

sending the registration request to the server, so that the server performs the authenticity verification for the vehicle terminal based on the device identification and the registration password, and returns registration input prompt information when a result of the authenticity verification is passed;

sending the user identity information input by the user according to the registration input prompt information to the server, so that the server completes registration of the user; and receiving a registration completion indication information returned by the server, wherein the registration completion indication information is used for indicating that the registration of the user is completed.

9. The server according to claim 7, wherein the processor is further configured to execute the computer program to implement steps of:
before said receiving the login request from the user equipment,
receiving a registration request from the user equipment, wherein the registration request includes a device identifier and a registration password corresponding to the vehicle terminal;
performing the authenticity verification on the vehicle terminal based on the device identifier and the registration password;
sending a registration input prompt message to the user equipment if the result of the authenticity verification is passed, so that the user inputs the user identity information under the prompt of the registration input prompt information;
completing registration of the user when the user identity information from the user equipment is received; and
returning registration completion indication information to the user equipment, wherein the registration completion indication information is used for indicating that the registration of the user is completed.

10. The server according to claim 7, wherein the processor is further configured to execute the computer program to implement the step of completing user registration when the user identity information from the user equipment is received by verifying authenticity of the account name and the login password when the user identity information from the user equipment is received; and storing the account name and the login password in association, and associating the account name with the vehicle terminal if the result of the authenticity verification is passed.

* * * * *